(12) United States Patent
Klug et al.

(10) Patent No.: US 10,181,363 B2
(45) Date of Patent: Jan. 15, 2019

(54) CONDUCTIVE POLYOXYMETHYLENE BASED ON STAINLESS STEEL FIBERS

(71) Applicant: Ticona LLC, Florence, KY (US)

(72) Inventors: Jeremy Hager Klug, Union, KY (US); Dwight D. Smith, Milton, IN (US)

(73) Assignee: Ticona LLC, Florence, KY (US)

( * ) Notice: Subject to any disclaimer, the term of this patent is extended or adjusted under 35 U.S.C. 154(b) by 562 days.

(21) Appl. No.: 14/096,209

(22) Filed: Dec. 4, 2013

(65) Prior Publication Data

US 2014/0186562 A1 Jul. 3, 2014

Related U.S. Application Data

(60) Provisional application No. 61/746,268, filed on Dec. 27, 2012, provisional application No. 61/774,951, filed on Mar. 8, 2013.

(51) Int. Cl.
| | |
|---|---|
| B32B 1/08 | (2006.01) |
| H01B 1/22 | (2006.01) |
| H01B 1/24 | (2006.01) |
| C08L 59/04 | (2006.01) |
| C08K 3/04 | (2006.01) |
| C08K 3/22 | (2006.01) |
| C08K 7/06 | (2006.01) |
| C08L 71/02 | (2006.01) |

(52) U.S. Cl.
CPC .............. *H01B 1/22* (2013.01); *C08K 3/04* (2013.01); *C08K 3/22* (2013.01); *C08K 7/06* (2013.01); *C08L 59/04* (2013.01); *C08L 71/02* (2013.01); *H01B 1/24* (2013.01); *C08K 3/041* (2017.05); *C08K 2003/2296* (2013.01); *C08K 2201/001* (2013.01); *Y10T 428/139* (2015.01)

(58) Field of Classification Search
CPC ....... B32B 1/02; B32B 1/08; Y10T 428/1352; Y10T 428/139; H01B 1/24; C08L 59/04; C08L 71/02; C08K 3/22; C08K 3/041; C08K 7/06; C08K 2003/2296; C08K 2201/001

See application file for complete search history.

(56) References Cited

U.S. PATENT DOCUMENTS

| | | | |
|---|---|---|---|
| 4,391,741 A | 7/1983 | Masamoto et al. | |
| 4,555,357 A | 11/1985 | Kausga et al. | |
| 4,828,755 A | 5/1989 | Kusumgar et al. | |
| 4,831,073 A | 5/1989 | Okushiro et al. | |
| 4,937,312 A | 6/1990 | Collins et al. | |
| 4,942,208 A * | 7/1990 | Forschirm | F23Q 2/42 264/237 |
| 5,076,920 A | 12/1991 | Danowski et al. | |
| 5,164,084 A | 11/1992 | Danowski et al. | |
| 5,164,879 A | 11/1992 | Danowski et al. | |
| 5,641,824 A | 6/1997 | Forschirm | |
| 6,262,165 B1 | 7/2001 | Ariyasu et al. | |
| 6,437,053 B1 | 8/2002 | Reuschel | |
| 6,489,388 B1 | 12/2002 | Kurz et al. | |
| 6,790,385 B2 | 9/2004 | Schleith et al. | |
| 6,974,849 B2 | 12/2005 | Notorgiacomo | |
| 7,396,492 B2 * | 7/2008 | Price | C08L 59/00 252/511 |
| 8,318,866 B2 | 11/2012 | Kurz et al. | |
| 2001/0007006 A1 * | 7/2001 | Tanimura | C08L 59/00 525/398 |
| 2007/0264514 A1 * | 11/2007 | Prigandt | B29C 45/1676 428/494 |
| 2007/0276070 A1 | 11/2007 | Kim et al. | |
| 2009/0048385 A1 * | 2/2009 | Horio | C08J 3/226 524/495 |
| 2009/0236565 A1 * | 9/2009 | Mercx | C08L 101/10 252/511 |

FOREIGN PATENT DOCUMENTS

| | | |
|---|---|---|
| EP | 412783 A2 * | 2/1991 |
| EP | 1508592 A1 * | 2/2005 |
| JP | 06240103 A * | 8/1994 |
| WO | WO 2012049287 A1 | 4/2012 |
| WO | WO 2012049293 A1 | 4/2012 |

OTHER PUBLICATIONS

International Search Report and Written Opinion for PCT/US2013/072996 dated Jul. 8, 2014, 11 pages.
Abstract and Machine Translation of WO 201311355, Aug. 8, 2013, 16 pages.

* cited by examiner

Primary Examiner — Marc A Patterson
(74) Attorney, Agent, or Firm — Dority & Manning, P.A.

(57) ABSTRACT

Polymer compositions containing a polyoxymethylene base polymer that is compounded with a conductive filler, a polyalkylene glycol, and a metal oxide are disclosed that exhibit electrostatic dissipative (ESD) capabilities while also being resistant to degradation upon exposure to aggressive fuels. For instance, the polymer compositions can have a volume resistivity of from about 1 Ohm-cm to about 200 Ohm-cm and a surface resistivity of about $10^3$ Ohms to about $10^4$ Ohms. Further, the polymer compositions can have a strain at break of from about 15% to about 23%. The polymer compositions can be formed into a shaped or molded article such as a connector, filter housing, baffle, flange, reservoir, port, tube, or pipe, etc. for use in fuel systems where uniform increased conductivity and resistance to aggressive fuels are required.

17 Claims, No Drawings

CONDUCTIVE POLYOXYMETHYLENE BASED ON STAINLESS STEEL FIBERS

RELATED APPLICATIONS

The present application claims priority to U.S. Provisional Application Ser. Nos. 61/746,268, filed on Dec. 27, 2012, and 61/774,951, filed on Mar. 8, 2013, which are incorporated herein in their entirety by reference thereto.

BACKGROUND OF THE INVENTION

Polyacetal polymers, which are commonly referred to as polyoxymethylene polymers, have become established as exceptionally useful engineering materials in a variety of applications. Polyoxymethylene polymers, for instance, are widely used in constructing molded parts, such as parts for use in the automotive industry and the electrical industry. Polyoxymethylene polymers have excellent mechanical properties, fatigue resistance, abrasion resistance, and chemical resistance.

Although polyoxymethylene polymers have excellent physical characteristics, the polymers may not be suitable components in certain applications, such as in fuel transfer applications, where the risk of a spark or explosion is increased. Because the electrical resistances within plastics such as polyoxymethylene are usually very high, there is a risk of electrostatic charging, which can be disruptive and even dangerous in certain application sectors, such as in the fuel and automotive sectors. This risk is due to the inability of the polymers to dissipate electrical charge. For instance, unlike metallic components, which provide an electrical pathway for electrical charges to move freely to ground, when a non-conductive, plastic component is used, such a pathway is removed, leaving no way for charges to drain to ground. This, in turn, creates a risk of sparking or explosion when a plastic component is used. As such, conductive fillers including metal fibers such as metal fibers or electroconductive (EC) carbon black can be added to polyoxymethylene to impart the polyoxymethylene with electrostatic dissipative (ESD) capabilities. However, although the addition of such fillers can improve the electrical conductivity of the polyoxymethylene, the amount of conductivity across an article formed from the ESD polyoxymethylene can be highly variable due to molding conditions and the inability to regulate the precise distribution of the conductive fillers within the polyoxymethylene resin. This can result in supposedly ESD capable polyoxymethylenes inadequately dissipating charge when needed.

Further, standard polyoxymethylene polymers may be susceptible to degradation when exposed to aggressive fuels. For instance, diesel fuel can age at high temperatures, resulting in a damaging effect on polyoxymethylene due to the oxidation of sulfur or sulfur-containing compounds. This, in turn, reduces the toughness (i.e., strain at break) of the polyoxymethylene. Further, gasoline fuels can have a degrading effect on polyoxymethylene as such fuels generally have an acidic and oxidative nature that, like diesel fuels, can also damage polyoxymethylene.

In view of the above, a need exists for a polyoxymethylene polymer composition that has improved electrostatic dissipative (ESD) capabilities and is resistant to degradation upon exposure to aggressive fuels, as well as articles formed from such a composition.

SUMMARY OF THE INVENTION

Generally speaking, the present disclosure is directed to a polyoxymethylene composition that exhibits ESD capabilities and that is resistant to degradation upon exposure to aggressive fuels. The polymer composition can be formed into a shaped article through any suitable process such as extrusion, injection molding, blow molding, etc. The shaped article be formed into any suitable shape and can be a component of any article requiring conductivity, and resistance to aggressive fuels, such as a connector, filter housing, baffle, flange, reservoir, port, tube, or pipe.

Of particular advantage, the polymer composition of the present disclosure includes a base polyoxymethylene polymer blended with a conductive filler such that the polymer composition has ESD capabilities. Further, so that the polymer composition can exhibit resistance to degradation upon exposure to aggressive fuels, the polymer composition also includes a polyalkylene glycol and a metal oxide, which can render the polymer composition resistant to degradation upon exposure to aggressive fuels and which can also enhance the electrical conductivity of the polymer composition by helping to uniformly disperse the conductive filler across articles formed from the composition. Other polyoxymethylenes in addition to the base polyoxymethylene, such as a high flow polyoxymethylene, can be included in the composition if desired. Moreover, additives can also be included in the polymer composition such as antioxidants, nucleants, formaldehyde scavengers, compatibilizers, UV stabilizers, light stabilizers, acid scavengers, etc.

More specifically, the polymer composition of the present disclosure comprises a base polyoxymethylene, a conductive filler, a polyalkylene glycol, and a metal oxide. Further, the polymer composition has a volume resistivity of from about 1 Ohm-cm to about 200 Ohm-cm. The base polyoxymethylene can have a melt flow rate of from about 8 grams per 10 minutes to about 40 grams per 10 minutes at 190° C. and a 2.16 kilogram load. In one embodiment, the base polyoxymethylene has a dioxolane content of from about 1.0% by weight to about 2.0% based on the total weight of the base polyoxymethylene. In another embodiment, the base polyoxymethylene is present in the polymer composition in an amount ranging from about 65% by weight to about 98% by weight based on the total weight of the polymer composition.

In yet another embodiment, the conductive filler comprises a metal powder, metal flakes, metal fibers, carbon fibers, carbon nanotubes, or combinations thereof. In one particular embodiment, the conductive filler comprises stainless steel fibers. The conductive filler can be present in the polymer composition in an amount ranging from about 1% by weight to about 30% by weight based on the total weight of the polymer composition.

In still another embodiment, the polymer composition further comprises a high flow polyoxymethylene. The high flow polyoxymethylene can have a melt flow rate of from about 14 grams per 10 minutes to about 55 grams per 10 minutes at 190° C. and a 2.16 kilogram load. The high flow polyoxymethylene can be present in the polymer composition in an amount ranging from about 1% by weight to about 30% by weight based on the total weight of the polymer composition.

In an additional embodiment, the polyalkylene glycol can be present in an amount ranging from about 0.01% by weight to about 10% by weight based on the total weight of the polymer composition. Further, the polyalkylene glycol can be polyethylene glycol. In another embodiment, the metal oxide can present in an amount ranging from about 0.01% by weight to about 10% by weight based on the total weight of the polymer composition. In addition, the metal oxide can be zinc oxide.

In additional embodiments, the polymer composition of the present disclosure can contain additional components. For instance, the polymer composition can further comprise an antioxidant, and the antioxidant can be present in an amount ranging from about 0.05% by weight to about 2% by weight based on the total weight of the polymer composition. The polymer composition can also further comprise a formaldehyde scavenger, and the formaldehyde scavenger can be present in an amount ranging from about 0.05% by weight to about 2% by weight based on the total weight of the polymer composition. Moreover, the polymer composition can further comprise a nucleant, and the nucleant can be present in an amount ranging from about 0.05% by weight to about 2% by weight based on the total weight of the polymer composition. Further still, the polymer composition can further comprise a lubricant, and the lubricant can be present in an amount ranging from about 0.005% by weight to about 1% by weight based on the total weight of the polymer composition. Additionally, the polymer composition can further comprise a compatibilizer, and the compatibilizer can be present in an amount ranging from about 0.005% by weight to about 1% by weight based on the total weight of the polymer composition. The polymer composition can also further comprise an acid scavenger, and the acid scavenger is present in an amount ranging from about 0.001% by weight to about 1% by weight based on the total weight of the polymer composition.

The present disclosure also embodies a shaped article formed from the polymer composition as defined above, wherein the shaped article comprises a connector, filter housing, baffle, flange, reservoir, port, tube, or pipe. The shaped article can have a surface resistivity of from about $10^3$ Ohms to about $10^4$ Ohms.

Other features and aspects of the present disclosure are discussed in greater detail below.

DETAILED DESCRIPTION

It is to be understood by one of ordinary skill in the art that the present discussion is a description of exemplary embodiments only, and is not intended as limiting the broader aspects of the present disclosure, In general, the present disclosure is directed to a polymer composition that is well suited to being molded into articles that are ductile, have exceptional fuel performance characteristics, and are highly conductive. The composition is formulated so as to increase the electrostatic dissipative (ESD) capabilities of the composition sufficient to satisfy SAE J1645 material and part requirements for conductivity of plastic materials for use in fuel systems. For instance, articles formed from the polymer composition of the present disclosure can have a volume resistivity of less than $10^6$ Ohm-cm. For example, the polymer composition of the present disclosure can have a volume resistivity ranging from about 1 Ohm-cm to about 200 Ohm-cm, such as from about 10 Ohm-cm to about 180 Ohm-cm, such as from about 15 Ohm-cm to about 160 Ohm-cm. Further, the polymer composition of the present disclosure can have a surface resistivity of from about 10 Ohms to about $10^4$ Ohms. It is also thought that the addition of the polyalkylene glycol and metal oxide can help to reduce the variance of the volume resistivity and surface resistivity across various sections of a molded composition or in different articles formed from the same molded composition when compared to other known conductive polymer compositions. Because of the aforementioned characteristics, the polymer composition of the present disclosure is suitable for use in applications where dissipation of electric charge and resistance to degradation due to aggressive fuels is desired.

As such, the polymer composition can be molded into articles for use in fuel or automotive applications where conductivity is required. Further, the polymer composition is formulated so that it is resistant to degradation upon exposure to aggressive fuels. Additives in the polymer composition can improve the toughness of the composition as compared to a polymer composition having a polyoxymethylene base without the additives.

More particularly, the polymer composition of the present disclosure comprises a base polyoxymethylene, a conductive filler, a polyalkylene glycol, a metal oxide, optional additional polyoxymethylenes such as a high flow polyoxymethylene, and optional additives that can be formed into a molded article. The combination of the base polyoxymethylene and the conductive filler with the polyalkylene glycol and metal oxide has been found to significantly decrease the volume resistivity and surface resistivity of the composition, resulting in a composition that is more conductive than a composition containing only the polyoxymethylene and conductive filler. Further, the polyalkylene glycol and metal oxide can enhance the toughness of the polymer composition of the present disclosure to provide for resistance due to degradation when exposed to aggressive fuels. For instance, the polymer composition of the present disclosure can have an increased strain at break ranging from about 15% to 23%, such as from about 16% to 22%, such as from about 17%-21%, as compared to a polymer composition without the polyalkylene glycol and metal oxide, which has a strain at break only ranging from about 12% to about 15%.

The components of polymer composition will now be discussed in more detail. First, the base polyoxymethylene can be a generally unbranched linear polymer containing at least 80%, such as at least 90%, of oxymethylene units (—$CH_2O$—). Further, the base polyoxymethylene can have a melt flow rate of from about 8 grams per 10 minutes to about 40 grams per 10 minutes, such as from about at 10 grams per 10 minutes to about 35 grams per 10 minutes, such as from about 12 grams per 10 minutes to about 30 grams per 10 minutes at 190° C. and a 2.6 kilogram load in accordance with ASTM D1238-82. The base polyoxymethylene can be present in the polymer composition in an amount ranging from about 65% by weight to about 98% by weight, such as in an amount ranging from about 70% by weight to about 95% by weight, such as in an amount ranging from about 75% by weight to about 90% by weight based on the total weight of the polymer composition.

In addition to the base polyoxymethylene composition discussed above, the polymer composition of the present disclosure further comprises a conductive filler, an optional high flow polyoxymethylene, a polyalkylene glycol, and a metal oxide.

The conductive filler can include conductive particles, powders, fibers or combinations thereof. For instance, the conductive filler may comprise metal powders, metal flakes, metal fibers (i.e., stainless steel fibers), carbon fibers, carbon nanotubes, or combinations thereof. Further, the conductive filler can be present in the polymer composition in an amount ranging from about 1% by weight to about 30% by weight, such as in an amount ranging from about 2% by weight to about 25% by weight, such as in an mount ranging from about 5% by weight to about 20% by weight based on the total weight of the polymer composition.

Further, although not required, a high flow polyoxymethylene polymer can be blended with the conductive filler and base polyoxymethylene. The high flow polyoxymethylene can have a melt flow rate of from about 14 grams per 10 minutes to about 55 grams per 10 minutes, such as from about 16 grams per 10 minutes to about 50 grams per 10 minutes, such as from about 20 grams per 10 minutes to about 45 grams per 10 minutes at 190° C. and a 2.16 kilogram load in accordance with ASTM D1238-82. The high flow polyoxymethylene can be present in the polymer composition in an amount ranging from about 1% by weight to about 30% by weight, such as in an amount ranging from about 2% by weight to about 25% by weight, such as in an amount ranging from about 5% by weight to about 20% by weight based on the total weight of the polymer composition.

The polymer composition further comprises a polyalkylene glycol and a metal oxide. The polyalkylene glycol can be present in the composition in an amount ranging from about 0.1% by weight to about 10% by weight, such as in an amount ranging from about 0.5% by weight to about 5% by weight, such as in an amount ranging from about 0.75% by weight to about 3% by weight based on the total weight of the polymer composition. Further, the metal oxide can be present in an amount ranging from about 0.1% by weight to about 10% by weight, such as in an amount ranging from about 0.5% by weight to about 5% by weight, such as in an amount ranging from about 0.75% by weight to about 3% by weight based on the total weight of the polymer composition.

In addition to the components discussed above, the polymer composition can contain various additives such as nucleants, lubricants, antioxidants, UV light absorbers, light stabilizers, formaldehyde scavengers, acid scavengers/antacids, compatibilizers, etc. These components can each be present in the composition in an amount less than about 2% by weight, such as in an amount less than about 1.5% by weight, such as in an amount less than about 1.0% by weight based on the total weight of the polymer composition.

As described above, the polymer composition of the present disclosure dramatically improves the electrostatic dissipative (ESD) capabilities of standard polyoxymethylene. Of particular advantage, molded parts made from the disclosed polymer composition are well suited for use in fuel applications where ESD capabilities are required. Further, the polymer composition of the present disclosure also improves the resistance to degradation when the polyoxymethylene-based polymer composition is exposed to aggressive fuels. Generally, the polymer composition of the present disclosure contains a base polyoxymethylene, a conductive filler, an optional high flow polyoxymethylene, a polyalkylene glycol, a metal oxide, and optional additives, and each of these components are discussed in more detail below.

Base Polyoxymethylene

In the present disclosure, the base polyoxymethylene to be rendered electrostatically dissipative and resistant to degradation upon exposure to aggressive fuels is generally an unbranched linear polymer that contains at least 80%, such as at least 90%, of oxymethylene units ($-CH_2O-$). It should be understood that the term polyoxymethylene here encompasses homopolymers of formaldehyde or of its cyclic oligomers, such as trioxane or tetraxane, and also corresponding copolymers, terpolymers and the like.

Polyoxymethylene homopolymers are prepared conventionally by polymerizing anhydrous formaldehyde or the trimer, trioxane. Polyoxymethylenes of suitable molecular weight for use herein may be prepared by polymerizing trioxane in the presence of Lewis acid catalysts such as antimony fluoride or boron trifluoride.

As is well known, ex reactor polyoxymethylene is stabilized predominantly by either end capping (e.g., acetylation of terminal hemiacetal via ester or ether groups) or by hydrolysis.

In one embodiment, polyoxymethylene copolymers with a proportion of 60% to 99.9% of recurring units being oxymethylene interspersed with the balance of oxy(higher alkylene) groups can be used to form the base polyoxymethylene. Oxy(higher alkylene) groups are introduced via cyclic ether or cyclic formal having at least two adjacent carbon atoms in the ring in addition to trioxane, such as via ethylene oxide 1,3-dioxolane with trioxane. Mention may be made of cyclic ethers ethylene oxide, propylene 1,2-oxide, butylene 1,2-oxide, butylene 1,3-oxide, 1,3-dioxane, 1,3-dioxolane, and 1,3-dioxepan, and also linear oligo- or polyformals, such as polydioxolane or polydioxepan as comonomers. In one embodiment, the dioxolane content can be from about 1.0% by weight to about 2.0% by weight, such as from about 1.25% by weight to about 1.75% by weight based on the total weight of the base polyoxymethylene. For example, the dioxolane content can be about 1.5% by weight based on the total weight of the base polyoxymethylene. The dioxolane content is decreased as compared to other polyoxymethylenes, which can have a dioxolane content of about 2.8% on average, resulting in increased mechanical strength and stiffness (modulus) for the polymer composition of the present disclosure. Further, the decreased dioxolane content also increases the melt temperature of the polymer composition of the present disclosure. The polyoxymethylene resins used herein have a number average molecular weight of at least 10,000 and I.V. of least 1.0 (at 25° C. in a 0.2 wt. % solution in hexafluoroisopropanol). Additionally, the polyoxymethylene copolymers have melting points of at least 150° C. and a weight average molecular weight ranging from about 5000 to about 200,000, such as from about 7000 to about 150,000. Particular preference is given to endgroup-stabilized polyoxymethylene polymers which have carbon-carbon bonds at the ends of the chains. Useful polyoxymethylene resins are crystalline, and have a melt flow rate of from about 8 grams per 10 minutes to about 40 grams per 10 minutes, such as such as from about 10 grams per 10 minutes to about 35 grams per 10 minutes, such as from about 12 grams per 10 minutes to about 30 grams per 10 minutes at 190° C. and a 2.16 kilogram load, in accordance with ASTM D1238-82.

Conductive Filler

Further, the base polyoxymethylene, whether it be a standard polyoxymethylene, an impact modified polyoxymethylene, or an aggressive fuel resistant polyoxymethylene as described in detail above, is compounded with a conductive filler such that the polymer composition of the present disclosure can exhibit ESD capabilities. The conductive filler can include conductive particles, powders, fibers or combinations thereof. For instance, the conductive filler may comprise metal powders, metal flakes, metal fibers (i.e., stainless steel fibers), carbon fibers, carbon nanotubes, or combinations thereof. However, the present inventors have found that by using metal fibers such as stainless steel fibers, for example, a polymer composition having ESD capabilities that is more ductile than and not as brittle as a polymer composition that includes electro-conductive carbon black can be formed. For instance, a composition containing metal fibers as described in the present application can exhibit a strain at break that do not decrease as significantly after exposure to aggressive fuels (e.g., CAP or diesel fuels) via immersion when compared to a composition containing carbon black, and, in some instances, the strain at break may even be increased for the composition of the present application. Further, when compared to a composition utilizing carbon black, utilizing metal fibers as described in the present application results in a composition that is not a likely to degrade in the presence of aggressive fuels, such that the composition exhibits little to no percent change in mass before and after exposure to aggressive fuels. Without intending to be limited by any particular theory, it is thought that the peroxides present in aggressive fuels cause the deterioration of the carbon powder but does not affect metal fibers such as stainless steel fibers as significantly.

The conductive filler can be present in the polymer composition of the present disclosure in an amount ranging from about 1% by weight to about 30% by weight, such as in an amount ranging from about 2% by weight to about 25% by weight, such as in an amount ranging from about 5% by weight to about 20% by weight, based on the total weight of the polymer composition.

Optional High Flow Polyoxymethylene

In addition to the base polyoxymethylene and conductive filler discussed above, the polymer composition can, in some embodiments, further comprise a high flow polyoxymethylene. The high flow polyoxymethylene, like the standard base polyoxymethylene discussed above, is generally an unbranched linear polymer that contains at least 80%, such as at least 90%, of oxymethylene units (—CH2O—). The high flow polyoxymethylene is generally formed in the same manner as discussed above in reference to the standard base polyoxymethylene, with the exception that the high flow polyoxymethylene has an increased melt flow rate compared to that of the standard base polyoxymethylene.

Useful high flow polyoxymethylene resins are crystalline, and have a melt flow rate of from about 14 to about 55 grams per 10 minutes, such as from about 16 grams per 10 minutes to about 50 grams per 10 minutes, such as from about 20 grams per 10 minutes to about 45 grams per 10 minutes at 190° C. and a 2.16 kilogram load in accordance with ASTM D1238-82.

Further, the high flow polyoxymethylene can be present in the polymer composition of the present disclosure in an amount ranging from about 1% by weight to about 30% by weight, such as in an amount ranging from about 2% by weight to about 25% by weight, such as in an amount ranging from about 5% by weight to about 20% by weight, based on the total weight of the polymer composition.

Polyalkylene Glycol

In addition to a base polyoxymethylene and a conductive filler, the present disclosure also contemplates the use of a polyalkylene glycol, which can act as a flexibilizer, to help increase the strain at break of the polymer composition. For instance, the base polyoxymethylene can include polyoxymethylene, polyalkylene glycol, and metal oxide.

Meanwhile, the polyalkylene glycol is represented by:

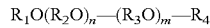

wherein $R_1$ and $R_4$ represent hydrogen, alkyl groups having 1 to 30 carbon atoms, acyl groups having 1 to 30 carbon atoms; $R_2$ and $R_3$ represent the same or different alkylene groups having 2 to 6 carbon atoms; and n and m represent integers satisfying the condition of being 1 or more and n+m<1000. Suitable polyalkylene glycols used herein have a mean number average molecular weight of from 10,000 to 45,000, in particular from 20,000 to 40,000. Polyalkylene glycols are obtained in the conventional manner by polycondensation of alkylene glycol as a monomer, e.g., polyethylene glycol, polypropylene glycol or a polyethylene-glycol-polypropylene-glycol block polymer. The polymerization mole number is preferably in the range of 5 to 1,000, more preferably in the range of 10 to 500. Examples of the polyalkylene glycol include polyethylene glycol oleyl ether (ethylene oxide polymerization mole number of 5 to 50), polyethylene glycol cetyl ether (ethylene oxide polymerization mole number of 5 to 20), polyethylene glycol stearyl ether (ethylene oxide polymerization mole number of 5 to 30), polyethylene glycol lauryl ether (ethylene oxide polymerization mole number of 5 to 30), polyethylene glycol tridecylether (ethylene oxide polymerization mole number of 5 to 30), polyethylene glycol nonylphenyl ether (ethylene oxide polymerization mole number of 2 to 100) and polyethylene glycol octylphenyl ether (ethylene oxide polymerization mole number of 4 to 50). Other polyalkylene glycols suitable herein include polyethylene glycol monolaurate (ethylene oxide polymerization mole number of 2 to 30), polyethylene glycol monostearate (ethylene oxide polymerization mole number of 2 to 50) and polyethylene glycol monooleate (ethylene oxide polymerization mole number of 2 to 10). The polyalkylene glycols may be used individually or in combination.

The polyalkylene glycol can be present in the aggressive fuel base polyoxymethylene in an amount ranging from about 0.10% by weight to about 10% by weight, such as in an amount ranging from about 0.5% by weight to about 5% by weight, such as in an amount ranging from about 0.75% by weight to about 3% by weight based on the total weight of the polymer composition.

Metal Oxide

Further, a metal oxide is also included in the polymer composition of the present disclosure. The metal oxide can include oxides of zinc, magnesium, calcium, manganese oxide and the like. The metal oxide can be present in the aggressive fuel base polyoxymethylene in an amount ranging from about 0.10% by weight to about 10% by weight, such as in an amount ranging from about 0.5% by weight to about 5% by weight, such as in an amount ranging from about 0.75% by weight to about 3% by weight based on the total weight of the polymer composition.

Additional Additives

In addition to the base polyoxymethylene, the conductive filler, the optional high flow polyoxymethylene, the polyalkylene glycol, and the metal oxide discussed above, the polymer composition of the present disclosure can also contain additives such as, for example, antioxidants, acid scavengers, formaldehyde scavengers, UV stabilizers or heat stabilizers. In addition, the composition can contain processing auxiliaries, for example adhesion promoters, lubricants, nucleants, compatibilizers, demolding agents, fillers, reinforcing materials, or antistatic agents and additives which impart a desired property to the articles formed from the polymer composition.

For instance, in one embodiment, an ultraviolet light stabilizer may be present. The ultraviolet light stabilizer may comprise a benzophenone, a benzotriazole, or a benzoate.

Particular examples of ultraviolet light stabilizers include 2,4-dihydroxy benzophenone, 2-hydroxy-4-methoxybenzophenone, 2-(2'-hydroxy-3',5'-di-t-butylphenyl)benzotriazole, 2-(2'-hydroxy-3'-t-butyl-5'-methylphenyl)-5-chlorobenzotriazole, 2,4-dihydroxybenzophenone, 2-hydroxy-4-methoxybenzophenone, 2-hydroxy-4-octoxybenzophenone, and 5,5'-methylene bis(2-hydroxy-4-methoxybenzophenone); 2-(2'-hydroxyphenyl)benzotriazoles, e.g., 2-(2'-hydroxy-5'-methylphenyl)benzotriazole, 2-(2'-hydroxy-5'-t-octylphenyl)benzotriazole, 2-(2'-hydroxy-3',5'-di-t-butylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, 2-(2'-hydroxy-3',5'-dicumylphenyl)benzotriazole, and 2,2'-methylene bis(4-t-octyl-6-benzotriazolyl)phenol, phenylsalicylate, resorcinol monobenzoate, 2,4-di-t-butylphenyl-3',5'-di-t-butyl-4'-hydroxybenzoate, and hexadecyl-3,5-di-t-butyl-4-hydroxybenzoate; substituted oxanilides, e.g., 2-ethyl-2'-ethoxyoxanilide and 2-ethoxy-4'-dodecyloxanilide; cyanoacrylates, e.g., ethyl-α-cyano-β,β-diphenylacrylate and methyl-2-cyano-3-methyl-3-(p-methoxyphenyl)acrylate or mixtures thereof. A specific example of an ultraviolet light absorber that may be present is UV 234, which is a high molecular weight ultraviolet light absorber of the hydroxyl phenyl benzotriazole class. The UV light absorber, when present, can be present in the polymer composition in an amount ranging from about 0.05% by weight to about 2% by weight, such as in an amount ranging from about 0.075% by weight to about 1.5% by weight, such as in an amount ranging from about 0.1% by weight to about 1% by weight based on the total weight of the polymer composition.

In one embodiment, the polymer composition may also include a formaldehyde scavenger, such as a nitrogen-containing compound. Mainly, of these are heterocyclic compounds having at least one nitrogen atom as hetero atom which is either adjacent to an amino-substituted carbon atom or to a carbonyl group, for example pyridine, pyrimidine, pyrazine, pyrrolidone, aminopyridine and compounds derived therefrom. Advantageous compounds of this nature are aminopyridine and compounds derived therefrom. Any of the aminopyridines is in principle suitable, for example 2,6-diaminopyridine, substituted and dimeric aminopyridines, and mixtures prepared from these compounds. Other advantageous materials are polyamides and dicyananmide, urea and its derivatives and also pyrrolidone and compounds derived therefrom. Examples of suitable pyrrolidones are imidazolidinone and compounds derived therefrom, such as hydantoines, derivatives of which are particularly advantageous, and those particularly advantageous among these compounds are allantoin and its derivatives. Other particularly advantageous compounds are triamino-1,3,5-triazine (melamine) and its derivatives, such as melamine-formaldehyde condensates and methylol melamine. Oligomeric polyamides are also suitable in principle for use as formaldehyde scavengers. The formaldehyde scavenger may be used individually or in combination.

Further, the formaldehyde scavenger can be a guanidine compound which can include an aliphatic guanamine-based compound, an alicyclic guanamine-based compound, an aromatic guanamine-based compound, a hetero atom-containing guanamine-based compound, or the like. The formaldehyde scavenger can be present in the polymer composition in an amount ranging from about 0.05% by weight to about 2% by weight, such as in an amount ranging from about 0.075% by weight to about 1.5% by weight, such as in an amount ranging from about 0.1% by weight to about 1% by weight based on the total weight of the polymer composition.

In one embodiment, the composition may also contain a nucleant. The nucleant may increase crystallinity and may comprise an oxymethylene terpolymer. In one particular embodiment, for instance, the nucelant may comprise a terpolymer of butanediol diglycidyl ether, ethylene oxide, and trioxane. The nucleant can be present in the composition in an amount ranging from about 0.05% by weight to about 2% by weight, such as in an amount ranging from about 0.075% by weight to about 1.5% by weight, such as in an amount ranging from about 0.1% by weight to about 1% by weight based on the total weight of the polymer composition.

Still another additive that may be present in the composition is a sterically hindered phenol compound, which may serve as an antioxidant. Examples of such compounds, which are available commercially, are pentaerythrityl tetrakis[3-(3,5-di-tert-butyl-4-hydroxyphenyl)propionate] (IRGANOX® 1010, BASF), triethylene glycol bis[3-(3-tert-butyl-4-hydroxy-5-methylphenyl)propionate] (IRGANOX® 245, BASF), 3,3'-bis[3-(3,5-di-tert-butyl-4-hydroxyphenyl)propionohydrazide] (IRGANOX® MD 1024, BASF), hexamethylene glycol bis[3-(3,5-di-tert-butyl-4-hydroxyphenyl)propionate] (IRGANOX® 259, BASF), and 3,5-di-tert-butyl-4-hydroxytoluene (LOWINOX® BHT, Chemtura). Another suitable antioxidant can be an aralkyl-substituted diarylamine such as 4,4'-bis-(alpha, alpha-dimethylbenzyl)diphenylamine (NAUGARD® 445) or 4,4'-bis-(alpha-methylbenzyl)diphenylamine. The antioxidant(s) may be present in the polymer composition in an amount ranging from about 0.05% by weight to about 2% by weight, such as in an amount ranging from about 0.075% by weight to about 1.5% by weight, such as in an amount ranging from 0.1% by weight to about 1% by weight based on the total weight of the polymer composition.

Light stabilizers that may be present in addition to the ultraviolet light stabilizer in the composition include sterically hindered amines. Hindered amine light stabilizers that may be used include oligomeric compounds that are N-methylated. For instance, another example of a hindered amine light stabilizer comprises ADK STAB LA-63 light stabilizer available from Adeka Palmarole. The light stabilizers, when present, can be present in the polymer composition in an amount ranging from about 0.05% by weight to about 2% by weight, such as in an amount ranging from about 0.075% by weight to about 1.5% by weight, such as in an amount ranging from about 0.1% by weight to about 1% by weight based on the total weight of the polymer composition.

In one embodiment, the composition may also contain one or more lubricants. The lubricant may comprise a polymer wax composition. Lubricants that may be included in the composition include, for instance, N,N'-ethylene bisstearamide or ethylene bis-stearamide (EBS) wax, which is based on monocarboxylic acids derived from naturally occurring vegetable oils. Further, in one embodiment, a polyethylene glycol polymer (processing aid) may be present in the composition. The polyethylene glycol, for instance, may have a molecular weight of from about 1000 to about 5000, such as from about 3000 to about 4000. In one embodiment, for instance, PEG-75 may be present. Lubricants can generally be present in the polymer composition in an amount ranging from about 0.005% by weight to about 1% by weight, such as in an amount ranging from about 0.01% by weight to about 0.75% by weight, such as in an amount ranging from about 0.02% by weight to about 0.5% by weight based on the total weight of the polymer composition.

In addition to the above components, the polymer composition may also contain an acid scavenger or antacid. The acid scavenger may comprise, for instance, an alkaline earth metal salt. For instance, the acid scavenger may comprise a calcium salt, such as a calcium citrate. The acid scavenger may be present in an amount ranging from about 0.001% by weight to about 1% by weight, such as in an amount ranging from about 0.002% by weight to about 0.5% by weight, such as from about 0.004% by weight to about 0.25% by weight based on the total weight of the polymer composition.

Further, the polymer composition may also contain a compatibilizer such as a phenoxy resin. Generally, the phenoxy resin can be present in the composition in an amount ranging from about 0.005% by weight to about 1% by weight, such as in an amount ranging from about 0.01% by weight to about 0.75% by weight, such as in an amount ranging from about 0.02% by weight to about 0.50% by weight based on the total weight of the polymer composition based on the total weight of the polymer composition.

Compounding of the Polymer Composition and Forming Parts Therefrom

In order to form an article from the polymer composition of the present disclosure, the aforementioned components are compounded together to form a homogeneous blend which can be formed into any desired shape. The composition is compounded, for example, by intensively mixing or melt kneading the components at an elevated temperature, such as at a temperature that is higher than the melting point of the polyoxymethylenes utilized in the polymer composition. For instance, the components can be mixed at a temperature ranging from about 160° C. to about 250° C., such as at a temperature ranging from about 180° C. to about 220° C.

Alternatively, two or more of the components of the polymer composition of the present disclosure may be combined together separately before ultimately being compounded with the remaining components. For instance, the conductive filler and the high flow polyoxymethylene, if utilized, can be compounded separately in a 50:50 blend, after which this blend can be compounded with the remaining components of the polymer composition. Further, the high flow polyoxymethylene can itself be formed into a blend containing a portion of the formaldehyde scavengers, antioxidants, compatibilizers, and lubricants discussed above.

An almost limitless variety of polymer articles may be formed from the polymer composition of the present disclosure. Shaped articles can be made from the disclosed polymer composition according to the present disclosure using various different processes. In one embodiment, for instance, the shaped articles can be formed through extrusion, injection molding, or blow molding processes. Articles that can be formed from the polymer composition of the present disclosure include connectors, filter housings, baffles, flanges, reservoirs, ports, tubes, pipes, etc. The present disclosure may be better understood with reference to the following example.

EXAMPLE 1

First, a polymer composition of the present disclosure was compounded and molded into samples. Then the parts were tested to determine their mechanical and electrical properties. The weight percentages of each of the components in the comparative composition (without the polyethylene glycol/zinc oxide package) and the example composition (without the polyethylene glycol/zinc oxide package), based on the total weight of the polymer composition, are shown below in Table 1:

TABLE 1

| Component | Weight % Comparative | Weight % Example |
|---|---|---|
| Polyoxymethylene with 13 g/10 min meltflow rate and dioxolane content of 1.5% | 83.85 | 80.85 |
| Stainess Steel Fibers | 7.50 | 7.50 |
| Polyoxymethylene with 45 g/10 min melt flow rate | 7.41975 | 7.41975 |
| Polyethylene glycol (35,000 g/mol # average molecular weight) | 0.00 | 2.00 |
| Zinc Oxide | 0.00 | 1.00 |
| Stabilizers | Q.S. to 100% | Q.S. to 100% |

The mechanical testing conditions and results for the comparative example without the polyethylene glycol and zinc oxide and the example of the present disclosure with the polyethylene glycol and zinc oxide are shown in Table 2, where each of the test samples had a thickness of about 4 mm and a width of about 10 mm:

TABLE 2

| Test Sample | Tensile Modulus (MPa) | Yield Stress (MPa) | Yield Strain (%) | Break Stress (MPa) | Strain @ Break (%) |
|---|---|---|---|---|---|
| Comparative 1 | 3311 | 64.87 | 10.97 | 64.77 | 12.86 |
| Comparative 2 | 3318 | 65.05 | 10.83 | 64.79 | 14.68 |
| Comparative 3 | 3261 | 64.96 | 10.71 | 64.84 | 13.56 |
| Comparative 4 | 3248 | 64.94 | 11.27 | 64.70 | 14.91 |
| Comparative 5 | 3218 | 64.85 | 11.25 | 64.51 | 15.45 |
| Comparative Average | 3271 | 64.93 | 11.00 | 64.72 | 14.29 |
| Comparative Standard Deviation | 42 | 0.08 | 0.25 | 0.13 | 1.05 |
| Example 1 | 3247 | 59.74 | 10.82 | 58.99 | 18.27 |
| Example 2 | 3183 | 59.59 | 11.31 | 58.76 | 18.47 |
| Example 3 | 3237 | 59.81 | 10.68 | 59.11 | 17.47 |
| Example 4 | 3249 | 59.60 | 11.33 | 58.41 | 20.88 |
| Example 5 | 3260 | 59.69 | 10.75 | 58.59 | 20.48 |
| Example Average | 3235 | 59.69 | 10.98 | 58.77 | 19.11 |
| Example Standard Deviation | 30 | 0.09 | 0.32 | 0.29 | 1.49 |

As shown above, the samples formed from the polymer composition of the present disclosure have a strain at break that is higher than the strain at break for the samples formed from the comparative composition. Meanwhile, the tensile modulus, yield stress, and break stress for the samples formed from the polymer composition of the present disclosure are slightly lower than those of the comparative composition. The yield strain for both sets of samples is generally similar.

Additionally, the volume resistivity testing conditions and results for the polymer composition of the present disclosure are shown below in Table 3:

TABLE 3

| Test Sample | Electrode Thickness (mm) | Electrode Width (mm) | Specimen Length (mm) | Voltage (V) | Volume Resistivity (Ohm-cm) |
|---|---|---|---|---|---|
| Example 1 | 3.98 | 10.09 | 79.0 | 2.0 | 21 |
| Example 2 | 3.96 | 10.08 | 78.0 | 2.0 | 39 |
| Example 3 | 3.94 | 10.07 | 79.0 | 2.0 | 155 |
| Example 4 | 3.96 | 10.09 | 78.9 | 2.0 | 110 |
| Example 5 | 3.96 | 10.08 | 79.2 | 2.0 | 87 |
| Example Average | | | | | 83 |
| Example Standard Deviation | | | | | 54 |
| Comparative Sample Volume Resistivity | | | | | >500 |

As shown above, the polymer composition of the present disclosure has a volume resistivity that is surprisingly much lower than the volume resistivity of other conductive polyoxymethylene compositions that are known in the art that do not contain the polyethylene glycol and zinc oxide additives, which are known to have a volume resistivities ranging from about 500 Ohm-cm to about 50,000 Ohm-cm and that can vary across samples of the same composition by about 300 Ohm-cm or more. This difference indicates that the polymer composition of the present disclosure is more conductive and less variable, which can enhance the ESD capabilities of articles formed from the polymer composition of the present disclosure when compared to other compositions.

In addition, the comparative test samples without the polyethylene glycol/zinc oxide package and the example test samples with the polyethylene glycol/zinc oxide package were tested for surface resistivity using a handheld ETS Autoranging Resistance Indicator (Model 880). The comparative test samples had a surface resistivity ranging from about 104 Ohms to about 108 Ohms, while the example test samples had a surface resistivity ranging from about 103 Ohms to about 104 Ohms. This indicates that the example samples with the polyethylene glycol/zinc oxide package have a higher conductivity than the comparative samples, which indicates that the polyoxymethylene composition of the present disclosure is more electrically dissipative than the comparative polyoxymethylene composition.

EXAMPLE 2

Next, a composition of the present application having stainless steel fibers as a conductive filler was compared with a composition having carbon black as a conductive filler. Each composition was then subjected to aggressive fuel immersion testing to determine the amount of degradation of each of the compositions upon exposure to aggressive fuels. In one test, the compositions were immersed in an aggressive fuel for 1200 hours at 60° C., and in another test, the compositions were immersed in an aggressive fuel for 5040 hours at 65° C. In each test, the fuel was changed biweekly throughout the duration of the test. The fuel in which the compositions were immersed was a CAP fuel blend. The CAP fuel blend included a base fuel containing an equal volume of toluene and iso-octane, 1 mL of aggressive water for hydrocarbons (at a concentration of 1 milliliter per liter of fuel), and a 70% tertiary butyl hydroperoxide solution (at a concentration of 6.7 milliliters per liter of fuel) so as to obtain 50 millimoles of peroxides per liter of fuel blend. The results of the immersion testing are summarized in Table 4 below:

TABLE 4

|  | POM with Stainless Steel Fibers (1200 hour, 60° C. test) | POM with Carbon Powder (1200 hour, 60° C. test) | POM with Stainless Steel Fibers (5040 hour, 65° C. test) | POM with Carbon Powder (5040 hour, 60° C. test) |
|---|---|---|---|---|
| % Change in Strain at Break | +17.1 | −73.6 | — | — |
| % Change in Strength at Yield | — | — | −28.3 | −38.4 |
| % Change in Mass | +1.7 | −3.0 | +0.1 | −51.1 |

As shown above in Table 4, when stainless steel fibers are added to a polyoxymethylene to impart electrical conductivity to the polyoxymethylene, the resulting composition is more resistant to aggressive fuels than a polyoxymethylene containing a carbon powder. For instance, the polyoxymethylene containing stainless steel fibers does not show a negative percent change in mass as does the polyoxymethylene containing carbon powder. Further, the percent change in the strain at break for the polyoxymethylene containing stainless steel fibers is even increased after 1200 hours of immersion testing, which is indicative of a more ductile, less brittle composition, while the strain at break for the polyoxymethylene containing carbon powder is decreased by about 73%, which is indicative of a more brittle, less ductile composition. Further, after 5040 hours of immersion testing, the strength at yield for the polyoxymethylene containing stainless steel fibers only shows a decrease of about 28%, while the strength at yield for the polyoxymethylene containing carbon powder shows a decrease of about 38©. Thus, a polyoxymethylene containing stainless steel fibers shows less degradation after immersion in an aggressive fuel than a polyoxymethylene containing carbon powder because, the polyoxymethylene containing carbon powders shows a loss in strain at break, a greater loss in tensile strength, and a greater loss in mass than the polyoxymethylene containing stainless steel fibers after immersion testing.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:
1. A polymer composition comprising:
  a base polyoxymethylene, wherein the base polyoxymethylene has a melt flow rate of from 12 grams per 10 minutes to about 30 grams per 10 minutes at 190° C. and a 2.16 kilogram load, wherein the base polyoxymethylene is linear, and wherein the base polyoxymethylene is present in an amount ranging from about 65% by weight to about 98% by weight based on the total weight of the polymer composition;
  a high flow polyoxymethylene, wherein the high flow polyoxymethylene has a melt flow rate of from about 14 grams per 10 minutes to about 55 grams per 10 minutes at 190° C. and a 2.16 kilogram load, wherein the high flow polyoxymethylene is linear;
  a conductive filler;
  a polyalkylene glycol; and a metal oxide, wherein the polymer composition has a volume resistivity of from about 1 Ohm-cm to about 200 Ohm-cm.

2. A polymer composition as defined in claim 1, wherein the base polyoxymethylene has a dioxolane content of from about 1.0% by weight to about 2.0% based on the total weight of the base polyoxymethylene.

3. A polymer composition as defined in claim 1, wherein the conductive filler comprises a metal powder, metal flakes, metal fibers, carbon fibers, carbon nanotubes, or combinations thereof.

4. A polymer composition as defined in claim 3, wherein the conductive filler comprises stainless steel fibers.

5. A polymer composition as defined in claim 1, wherein the conductive filler is present in the polymer composition in an amount ranging from about 1% by weight to about 30% by weight based on the total weight of the polymer composition.

6. A polymer composition as defined in claim 1, wherein the high flow polyoxymethylene is present in the polymer composition in an amount ranging from about 1% by weight to about 30% by weight based on the total weight of the polymer composition.

7. A polymer composition as defined in claim 1, wherein the polyalkylene glycol is present in an amount ranging from about 0.01% by weight to about 10% by weight based on the total weight of the polymer composition.

8. A polymer composition as defined in claim 1, wherein the polyalkylene glycol is polyethylene glycol.

9. A polymer composition as defined in claim 1, wherein the metal oxide is present in an amount ranging from about 0.01% by weight to about 10% by weight based on the total weight of the polymer composition.

10. A polymer composition as defined in claim 1, wherein the metal oxide is zinc oxide.

11. A polymer composition as defined in claim 1, wherein the polymer composition further comprises an antioxidant, wherein the antioxidant is present in an amount ranging from about 0.05% by weight to about 2% by weight based on the total weight of the polymer composition.

12. A polymer composition as defined in claim 1, wherein the polymer composition further comprises a formaldehyde scavenger, wherein the formaldehyde scavenger is present in an amount ranging from about 0.05% by weight to about 2% by weight based on the total weight of the polymer composition.

13. A polymer composition as defined in claim 1, wherein the polymer composition further comprises a nucleant, wherein the nucleant is present in an amount ranging from about 0.05% by weight to about 2% by weight based on the total weight of the polymer composition.

14. A polymer composition as defined in claim 1, wherein the polymer composition further comprises a lubricant, wherein the lubricant is present in an amount ranging from about 0.005% by weight to about 1% by weight based on the total weight of the polymer composition.

15. A polymer composition as defined in claim 1, wherein the polymer composition further comprises a compatibilizer, wherein the compatibilizer is present in an amount ranging from about 0.005% by weight to about 1% by weight based on the total weight of the polymer composition.

16. A shaped article formed from the polymer composition as defined in claim 1, wherein the shaped article comprises a connector, filter housing, baffle, flange, reservoir, port, tube, or pipe.

17. A shaped article formed from the polymer composition as defined in claim 1, wherein the shaped article has a surface resistivity of from about $10^3$ Ohms to about $10^4$ Ohms.

* * * * *